(12) United States Patent
Tellenbach et al.

(10) Patent No.: US 7,243,558 B2
(45) Date of Patent: Jul. 17, 2007

(54) BONDING OF STRAIN GAUGES TO THE DEFORMABLE BODY OF A FORCE-MEASURING CELL

(75) Inventors: Jean-Maurice Tellenbach, Hettlingen (CH); Volker Ziebart, Schlatt (CH)

(73) Assignee: Mettler-Toledo AG, Greifensee (CH)

( * ) Notice: Subject to any disclaimer, the term of this patent is extended or adjusted under 35 U.S.C. 154(b) by 95 days.

(21) Appl. No.: 11/043,161

(22) Filed: Jan. 27, 2005

(65) Prior Publication Data

US 2005/0160837 A1    Jul. 28, 2005

(30) Foreign Application Priority Data

Jan. 27, 2004  (EP) .................. 04075198

(51) Int. Cl.
*G01L 9/00* (2006.01)
(52) U.S. Cl. .................. 73/862.625; 73/862.627; 73/862.632
(58) Field of Classification Search .......... None
See application file for complete search history.

(56) References Cited

U.S. PATENT DOCUMENTS

| 3,935,636 A | | 2/1976 | Mermelstein |
| 4,680,858 A | * | 7/1987 | Johnson ............ 29/621.1 |
| 5,631,622 A | * | 5/1997 | Hauber et al. .......... 338/2 |
| 6,631,646 B1 | | 10/2003 | Maitland |

FOREIGN PATENT DOCUMENTS

| DE | 43 20 666 A1 | 1/1995 |
| GB | 2 051 819 | 1/1981 |

OTHER PUBLICATIONS

*K.-H. Haas et al., "Functionalized Coating Based on Inorganic-Organic Polymers (Ormocer® S) and Their Cmbination with Vapor Deposited Inorganic Thin Films", Surface and Coatings Technology, 111, 1999, , pp. 72-79.

* cited by examiner

*Primary Examiner*—Edward Lefkowitz
*Assistant Examiner*—Freddie Kirkland, III
(74) *Attorney, Agent, or Firm*—Buchanan Ingersoll & Rooney PC

(57) ABSTRACT

In a force-measuring cell with a deformable body and with at least one strain gauge which has a strain-sensitive electrical resistor track arranged on a polymer carrier substrate, the strain gauge is bonded to the deformable body by an adhesive layer of an inorganic-organic hybrid polymer. For the bonding of the strain gauge to the deformable body, an adhesive compound having an inorganic-organic hybrid polymer in solution is applied to the deformable body, whereupon the strain gauge is placed on the hybrid polymer layer, and the adhesive layer is subsequently hardened at a temperature between 80° C. and 130° C. For the hardening of the adhesive layer, the deformable body with the strain gauge is exposed to the increased temperature for a time period between a half hour and three hours.

14 Claims, 2 Drawing Sheets

BONDING OF STRAIN GAUGES TO THE DEFORMABLE BODY OF A FORCE-MEASURING CELL

RELATED APPLICATIONS

This application claims benefit to European Priority Patent Application Serial Number 04 075 198.4, filed Jan. 27, 2004. This priority application is hereby incorporated by reference in its entirety.

BACKGROUND

1. Field

A force-measuring cell with a deformable body is disclosed, with at least one strain gauge installed on the deformable body by an adhesive layer, wherein the at least one strain gauge has a strain-sensitive electrical resistor track arranged on a carrier substrate. A method of bonding a strain-gauge to a deformable body is also disclosed.

2. Background Information

A strain gauge has a carrier substrate on which a metallic resistor track is arranged which can be made in the shape of a meandering structure by a known chemical etching method. Also arranged on the carrier substrate are connector electrodes for contacting the resistor track. The connector electrodes are often made in one work operation together with the resistor track, and they can consist therefore of the same material. Electrically insulating materials are used for the carrier substrates of strain gauges. Depending on the area of application, one finds carrier substrates of glass, ceramic materials, in many cases polymers, glass-fiber reinforced polymers, or composite materials. Strain gauges are measuring elements in which a mechanical deformation causes a change of the electrical resistance and which are therefore used for the measurement of the force that produces the deformation.

In the field of weighing technology, to name an example, a force acting on a deformable body causes a deformation which is converted into an electrical signal by strain gauges. In a force-measuring cell that functions according to this principle, a load on the weighing pan which is connected to the vertically movable load-receiving part of the deformable body produces a displacement of the load-receiving part in relation to the spatially fixed part of the deformable body. In an exemplary embodiment, the deformable bodies used in force-measuring cells have four elastic bending zones formed by thin material portions which are located at the four corners of a parallelogram, so that the load-receiving part is arranged as a vertically movable leg of the parallelogram opposite a fixed, likewise vertical parallelogram leg that is preferably fastened to the housing of a weighing scale. The magnitude of the deformation that occurs in the thin bending zones is measured as an electrical resistance change by at least one strain gauge that can be installed on one of the bending zones by an electrically insulating adhesive layer.

Because of their elastic properties, polymer substrate materials are an exemplary choice for strain gauges used in the field of weighing technology, in particular polyimides, but also epoxy resins, phenolic resins, melamines and ketones. Polymer carrier substrates have the advantage of a lower rigidity, so that their shape can conform more easily to the deformable body. This reduces in particular the mechanical stress on the adhesive layer. Hysteresis effects or a destruction of the adhesive layer that can occur when a rigid substrate is bonded to a deformable body are found far less often with polymer substrates. Furthermore, in the case of strain gauges with a meander-patterned resistor track polymer substrates offer the possibility of compensating a drift in the load signal through the known method of designing the return loops of the resistor track with an appropriately selected shape. Besides, strain gauges with polymer carrier substrates are easier to handle and more cost-effective to produce.

Epoxy compounds have been used for the adhesive layer, known for example under the trade designations M-Bond 610 or M-Bond 43-B, which are available from Vishay Micro-Measurements. These adhesives, which are in liquid form, are applied to the deformable body in the areas of the bending zones, for example with a brush at room temperature. Next, the strain gauge is put in place and the adhesive bond is hardened in an oven preferably under pressure and at temperatures between 150° C. and 180° C. The time period for the exposure to the increased temperature is a few hours, as a rule 6 to 8 hours.

The drawbacks associated with the use of this adhesive material and the method of bonding the strain gauge to the deformable body are that on the one hand the deformable body will during the exposure to the increased temperature in the hardening process change its elastic properties towards an increase in the inelastic effects and that on the other hand so-called thermal stresses will build up in an installed strain gauge in particular during the cooling-down process. Dependent on the hardening temperature and also on the subsequent storage temperature this will lead to a relaxation of these stresses, that may remain observable over an extended time period, i.e., up to a few months.

Inorganic-organic hybrid polymers which are known, e.g., under the trade name ORMOCER® are a new class of bonding materials that consist of inorganic and organic networks which connect with each other and penetrate each other on a molecular level. They are produced according to a sol-gel process in the presence of acidic or basic catalysts. They are distinguished by their high durability, high pressure- and scratch resistance, as well as an excellent module of elasticity. In addition, they can be produced cost-effectively. To name an example, the use of inorganic-organic hybrid polymers in the field of dental technology is described in DE 100 16 324 A1.

A method of producing these materials is described in DE 43 03 570 A1. In a first step, a hydrolytic polycondensation of crosslinkable organofunctional silanes and at least one metallic compound takes place. This condensation can in some cases take place in the presence of non-crosslinkable organofunctional silanes and low-volatile oxides that are soluble in the reaction medium. In a second step, an organically crosslinkable pre-polymer is added, followed by a third step in which the material is put on a substrate and a fourth step in which the material is hardened by radiation or heat treatment.

The inorganic-organic hybrid polymers are credited with a high abrasion- and scratch resistance as well as good adhesion to any base materials such as metals, plastics, glass and ceramics. The inorganic network lends properties such as hardness and thermal stability to the inorganic-organic hybrid polymers, while the organic network determines the elastic properties. Physical properties such as, e.g., the modulus of elasticity or the coefficient of thermal expansion are influenced by the ratio between the respective degrees of inorganic and organic crosslinking. The physical properties can also be modified by adding filler materials.

A lamination adhesive of inorganic-organic hybrid polymers is disclosed in DE 101 38 423 A1, where modified filler materials are tied into the inorganic-organic polymer network through covalent or ionic bonds. This can improve the barrier effect against gases and vapors of the compound systems, such as foils for the packaging of food products.

All of the aforementioned documents are hereby incorporated by reference in their entireties.

SUMMARY

An effective bond is disclosed with improved properties between a deformable body of a force-measuring cell and a strain gauge that is to be installed on the deformable body.

In a force-measuring cell with a deformable body on which at least one strain gauge is installed which has a strain-sensitive electrical resistor track arranged on a polymer carrier substrate, the strain gauge is bonded to the deformable body by an adhesive layer of an inorganic-organic hybrid polymer.

In a method of attaching a strain gauge to the deformable body of a force-measuring cell, an inorganic-organic hybrid polymer in solution is applied to the deformable body, whereupon the strain gauge is laid on the hybrid polymer layer and the adhesive layer is subsequently hardened at a temperature between 80° C. and 130° C. With this procedure, the deformable body with the strain gauge is exposed to the increased temperature during a time period of between half an hour and three hours.

A decisive advantage should be seen in the fact that the inorganic-organic hybrid polymers harden in less time and the temperature levels that are normally required for the crosslinking to take place are lower than the temperature levels for the epoxy adhesives that are used according to the existing state of the art for attaching a strain gauge to the deformable body of a force-measuring cell.

The viscoelasticity of a deformable body, which increases with higher temperature levels and a longer exposure of the deformable body to the increased temperature and which manifests itself as a permanent change, is therefore significantly less pronounced in comparison to the state of the art, with the result that a reduced amount of creep and a higher zero-point stability are subsequently observed in the measurement performance of the force-measuring cell.

The comparatively lower hardening temperatures and hardening times of the adhesive layer cause a lower amount of stress in the bond with the strain gauge during the cool-off phase than the longer exposure to higher temperatures that occurs with the bonding methods with adhesive materials according to the state of the art, whereby the relaxation of the thermal stresses is significantly shortened and at the same time reduced in magnitude.

Since the physical properties of inorganic-organic hybrid polymers can be set to desired target values not only through the selection of the base material components and through the addition of filler substances, but also by controlling the process parameters, it is possible to provide an outstanding degree of adaptation of the thermal expansion coefficient and the module of elasticity to those of the carrier substrate material of the strain gauge. As a result, the strain gauges that are installed by means of inorganic-organic hybrid polymers show a more stable strain transfer.

The deformable body which can be made of aluminum is provided with an aluminum oxide layer of a few nanometers thickness which, as is generally known, is formed when the aluminum is stored in air. This oxide layer is particularly well suited to establish a solid attachment between the deformable body and the adhesive layer of the inorganic-organic hybrid polymer, because hybrid polymers enter into a predominantly covalent bond with metal oxide surfaces. In addition, the aluminum oxide layer of the deformable body is porous so that, primarily through the inorganic components, a mechanical anchoring of the adhesive layer in the aluminum oxide layer takes place, which is likewise conducive to an increased adhesion.

If an even stronger anchoring effect is desired, the thickness of the aluminum oxide layer can be increased by appropriate measures, for example by subjecting the deformable body to an oxygen atmosphere at a moderately increased temperature or to a chemical or electrochemical pretreatment before attaching the strain gauges.

In addition to the excellent adhesive properties, the inorganic-organic hybrid polymers also have a certain barrier effect against water vapor or oxygen. Consequently, the penetration of moisture by way of the adhesive layer, i.e., from below, into the polymer substrate material can be reduced in certain carrier substrate materials, for example in polyimide.

As an additional protective measure against moisture, a strain gauge that is already installed on a deformable body can be provided with a protective coating. This coating can have a surface-smoothing layer which is applied directly to the strain gauge and which can likewise include, or consist of, an inorganic-organic hybrid polymer, such as one that matches the adhesive layer. The coating can further include a protective coating which is configured in an exemplary embodiment as a multilayered coating with barrier layers and intermediate layers. Exemplary choices for the barrier layers are predominantly inorganic materials, while the intermediate layers can be polymers or also inorganic materials.

The application of the inorganic-organic hybrid polymer materials in solution on the deformable body can be performed by the tampon-printing technique. This allows adhesive layers to be applied with a defined uniform thickness that is constant over the area of the strain gauge. Uniformity of the adhesive layer can be desired to achieve a favorable hysteresis behavior and a low drift in a load cell that comprises the deformable body. Since the form stability of an adhesive layer of inorganic-organic hybrid polymers that is applied by tampon-printing is better than that of conventional adhesives, the tampon-printed adhesive layer has an only slightly larger surface area than the strain gauge.

BRIEF DESCRIPTION OF THE DRAWINGS

The invention will be described hereinafter in more detail with reference to the drawings, wherein.

DETAILED DESCRIPTION

Figure 1:
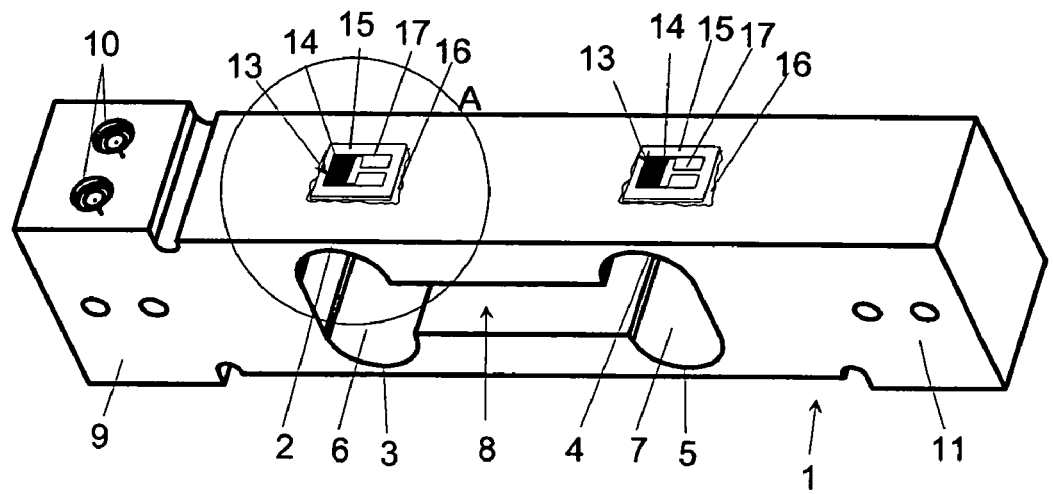
FIG. 1 represents a three-dimensional view of an exemplary deformable body of a weighing cell with strain gauges installed on the thin material portions that form the bending pivots.

FIG. 1 illustrates an exemplary deformable body 1 of a weighing cell with four elastic bending zones 2, 3, 4, 5 arranged at the corner points of a parallelogram. The bending zones 2, 3, 4, 5 are formed by the curved contours of widened end portions 6, 7 of a cutout 8 at the center of the monolithic deformable body 1. The load receiver 9 of the deformable body 1, which is shown in the left-hand part of FIG. 1, is vertically movable. If a load is put on a weighing pan, which is not shown in the drawing but can be fastened by means of several screws to the tapped holes 10 of the load receiver 9, the load receiver 9 is moved vertically downward in relation to a stationary part 11 (shown in the right-hand part of the drawing) of the deformable body 1 which is fastened directly to a housing or to an intermediate mounting bracket, as the bending zones 2, 3, 4 and 5 undergo a deformation. This deformation is measured by means of strain gauges 13 that are adhesively bonded to the top side 12 of the deformable body 1 at the bending zones 2 and 4. The strain gauges 13 have a strain-sensitive resistor track 14 which can be arranged in the shape of a meandering pattern on a carrier substrate 15. The resistor track 14 is connected to connector electrodes 17 through which the resistor track 14 is tied into the sensor bridge circuit (not shown here). The carrier substrate 14 includes, or consists of, a polyimide foil with a thickness of between 10 and 30 microns. Strain gauges 13 can be arranged not only at the bending zones 2, 4 on the top side 12 of the deformable body 1 but also at the bending zones on the bottom side of the deformable body 1 which is not visible in the drawing. The strain gauges 13 can be bonded to the deformable body 1 through an adhesive layer 16.

The adhesive layer 16 includes, or consists of, an inorganic-organic hybrid polymer. This class of substances which are known for example under the trade name ORMOCER® includes inorganic as well as organic network structures. The build-up of the inorganic silicate-based network structure can be performed by way of the sol-gel process through the controlled hydrolysis and condensation of alkoxy silanes, where the silicate-based network can be modified in a controlled manner by including additional metal alkoxides into the process. Additionally an organic network can be built up through the polymerization of organofunctional groups which are brought into the material by way of the organo-alkoxylanes. Reactive methacrylate-, epoxy-, or vinyl-groups are polymerized by thermal or photochemical treatment. The inorganic-organic hybrid polymers described in DE 196 50 286 A1, the contents of which are hereby incorporated by reference in their entirety, can be considered as examples for the adhesive material.

In addition to good adhesive properties, the inorganic-organic hybrid polymers, such as those modified by filler substances such as functionalized $SiO_2$ particles or $Al_2O_3$ particles, can have a five to ten times stronger barrier effect than state-of-the-art epoxy adhesives against moisture penetration, for example water vapor. This can reduce the rate of moisture penetration by way of the adhesive layer 16 into the polyimide substrate 15 which leads to an undesirable swelling-up of the polyimide material.

Figure 2:
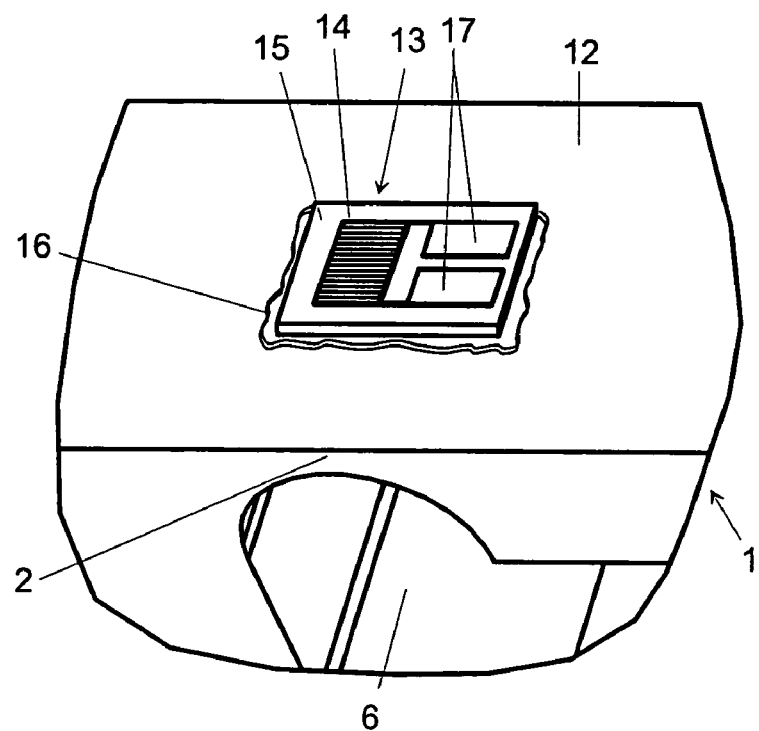
FIG. 2 represents an enlarged three-dimensional view of the part of the deformable body that is framed by the circle A in FIG. 1, on which a strain gauge is installed.

FIG. 2 gives an enlarged view of the part of the deformable body 1 that is framed by the circle A in FIG. 1. As in FIG. 1, the strain gauge 13 that is installed at the bending zone 2 on the topside of the deformable body 1 is illustrated, including in particular the aforementioned adhesive layer 16. The adhesive layer 16 covers a somewhat larger surface area of the deformable body 1 than the strain gauge 13, thereby ensuring that the adhesion extends over the entire surface area of the carrier substrate. The application of the adhesive compound to the deformable body, such as by brush strokes, roller- or spray application or through tampon-printing, will be described hereinafter in more detail.

Figure 3:
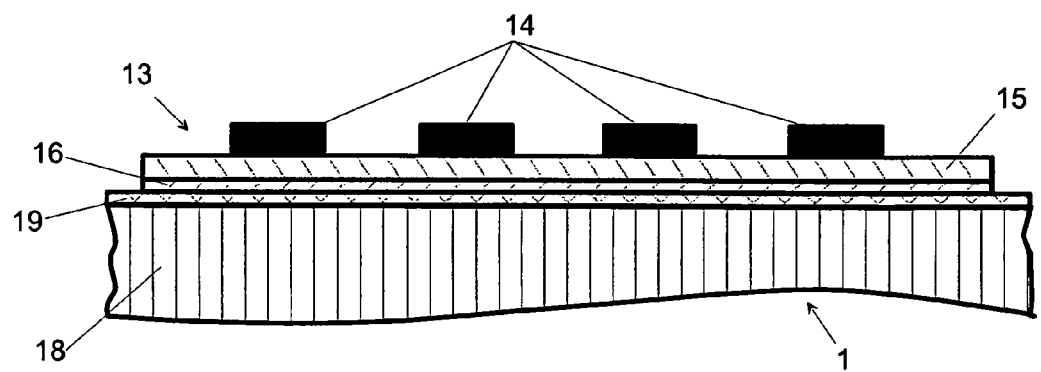
FIG. 3 represents a sectional view of an exemplary individual strain gauge installed on a deformable body.

In a fragmentary sectional view of the deformable body 1, FIG. 3 illustrates an exemplary arrangement of a strain gauge 13 that is adhesively attached to the deformable body 1, with a resistor track 14 on the polyimide carrier substrate 15. It should be mentioned at this point that the layers and different parts are not drawn to scale. Also shown is a portion 18 of the deformable body 1 including, or consisting of, aluminum with the aluminum oxide layer 19 on its surface.

The adhesive layer 16 is arranged directly on the aluminum oxide layer 19 and thus connects a metal oxide with a polymer.

The inorganic-organic hybrid polymer enters into a covalent bond with the aluminum oxide layer 19 and thereby ensures good adhesion. In particular, due to the porosity of the aluminum oxide layer 19, a mechanical anchoring of the adhesive layer 16 in the aluminum oxide layer 19 takes place. Through an appropriate pretreatment of the deformable aluminum body, specifically by heating to a temperature below 100° C. in an oxygen atmosphere or by a chemical or electrochemical treatment, the thickness of the aluminum oxide layer 19 can be increased by a controlled amount and its porosity can be modified in order to enhance the adhesive effect.

Figure 4:
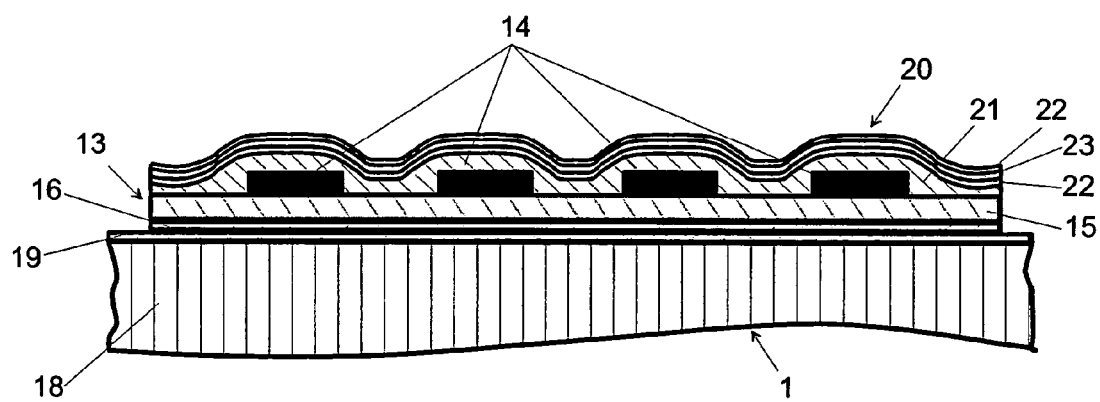
FIG. 4 represents a sectional view of an exemplary individual strain gauge that is installed on a deformable body and provided with a protective coating against moisture penetration.

FIG. 4 represents again a sectional view of the arrangement shown in FIG. 3, wherein additionally the strain gauge 13 is topped with a protective coating 20 against moisture penetration. This protective coating 20 includes, or consists of, an inorganic material and can have an inhomogeneous composition over the range of its thickness. In an exemplary configuration, the protective coating 20 includes, or consists of, several layers of silicon nitride alternating with silicon oxide, wherein the thickness of each individual layer lies between 50 and 200 nanometers. FIG. 4 shows an example of the protective coating 20 with three layers, i.e., a first layer of silicon nitride 22, a second layer of silicon oxide 23, and a third layer of silicon nitride 22. The silicon nitride layers 22 serve as barrier layers, while the silicon oxide layers 23 as intermediate layers have the purpose of covering microscopic pores and fissures of the barrier layer.

The multilayered coating 20 is underlaid with a surface-smoothing layer 21 of a polymer, for example an acrylate- or methacrylate polymer layer or an inorganic-organic hybrid polymer layer, such as of a type that matches the adhesive layer 16. A layer 21 of this kind serves to smooth out the surface of the strain gauge 13, in particular at the edges, for example at the edges of the resistor track 14, whereby the steepness of their flanks is reduced. In addition, irregularities of the surface or even faults or dirt particles, whether on the resistor track 14 or the carrier substrate 15, are covered and evened out. As a further result, when an inorganic protective coating 20 is deposited on the surface-smoothing polymer layer 21, the probability can be reduced that microscopic pores or hairline breaks in the inorganic protective coating 20 will independently occur or attach themselves to the irregularities of the underlying surface. Consequently, favorable conditions can be provided for the formation of a multilayered inorganic protective coating 20 with a low incidence of faults, which is deposited or designed to be deposited on the surface-smoothing layer 21.

The protective coating can already exist on the strain gauge 13 that is to be installed, or it can be applied to the strain gauges 13 after they have been attached to the deformable body 1 by means of the adhesive layer 16. In the latter case, a part of the protective coating 20 and of the underlying surface-smoothing polymer layer 21 extend beyond the strain gauge 13 and cover at least a part of the deformable body 1, in particular the areas of the deformable body 1 that border on the strain gauge 13. This further reduces moisture penetration into the carrier substrate 15.

The adhesive compound is present as a solution of the pre-condensated inorganic components and the organic components, such as reactive organic groups in a conventional lacquer solvent. By varying the proportion of the solvent, the viscosity of the adhesive compound can be adapted to the requirements of the selected method of application, for example by brush strokes, centrifuge-deposition, spraying, roller application, or tampon-printing.

Under an exemplary method for the application of a strain gauge 13 to the deformable body 1 of a force-measuring cell, an inorganic-organic hybrid polymer in solution can be applied to the deformable body 1 by means of a tampon-printing method, whereupon the strain gauge 13 is placed on the surface area covered by the adhesive solution and pushed down with light pressure. By heating at temperatures between 80° C. and 130° C. while applying a contact pressure between 100 kN/m² and 1000 kN/m² to the strain gauge, the adhesive layer 16 will harden by crosslinking. The hardening temperature depends on the selection of the components of the inorganic-organic hybrid polymer and is coordinated with the length of the exposure to the increased temperature which can be between one and three hours, in order to minimize the increase in viscoelasticity of the deformable body. It should be noted at this point that the viscoelasticity of aluminum can already be reduced by 50% by lowering the hardening temperature from 150° C. to 100° C.

Under an exemplary prescribed method for tampon-printing, the inorganic-organic hybrid polymer in solution, i.e., the adhesive compound, is taken up by an elastically deformable cushion, i.e., the tampon, from a plate with an etched recessed area, i.e., the cliche, and deposited directly on the deformable body at the location where the strain gauge is to be attached. With an appropriately adjusted viscosity of the solution on the one hand and due to the deformability of the tampon on the other hand, the contour shape of the adhesive compound is maintained in the deposition and a uniform adhesive layer 16 is produced.

The force-measuring cell with a strain gauge that was installed by means of an exemplary adhesive layer according to exemplary embodiments has been described and illustrated. However, those skilled in the art will be able to realize further embodiments based on the teachings discussed herein. For example, the material for the carrier substrate of the strain gauge is not limited to polyimide. One could also use other polymers such as epoxy compounds, phenolic resins, melamines and ketones for strain gauges that find application in the field of weighing technology. The material to be used for the adhesive layer will in each case depend on the carrier substrate material. This applies in particular to the variation of the polymer component of the inorganic-organic hybrid polymer.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. Force-measuring cell comprising:
at least one strain gauge which has a strain-sensitive electrical resistor track arranged on a polymer carrier substrate and which is installed on a deformable body by means of an adhesive layer, wherein the adhesive layer includes an inorganic-organic hybrid polymer;
wherein the deformable body is made of aluminum, wherein the deformable body has on its surface an aluminum oxide layer which in comparison to a natural oxide layer has an increased thickness and/or an increased porosity due to a chemical, electrochemical or thermal treatment, whereby a bond to the adhesive layer is strengthened by a mechanical anchoring of the adhesive layer in the aluminum oxide layer.

2. Force-measuring cell according to claim 1, wherein the adhesive layer consists essentially of the inorganic-organic hybrid polymer.

3. Force-measuring cell according to claim 1, wherein the at least one strain gauge is provided with a protective coating against moisture penetration, wherein the protective coating is underlaid with a surface-smoothing polymer layer.

4. Force-measuring cell according to claim 3, wherein the protective coating is a multilayered coating which is composed of an alternating sequence of a barrier layer, and an intermediate layer.

5. Force-measuring cell according to claim 4, wherein the barrier layer is silicon nitride and the intermediate layer is silicon oxide.

6. Force-measuring cell according to claim 3, wherein the surface-smoothing layer that lies under the protective coating comprises an inorganic-organic hybrid polymer that matches the adhesive layer.

7. The force-measuring cell of claim 1, wherein the deformable body comprises a body comprises a plurality of elastic bending zones formed by thin material portions.

8. The force-measuring cell of claim 7, comprising four elastic bending zones.

9. The force-measuring cell of claim 7, wherein the at least one strain gauge measures a magnitude of deformation in at least one of the elastic bending zones.

10. Method of fastening a strain gauge on an aluminum deformable body of a force-measuring cell, comprising:
heating the deformable aluminum body under oxygen atmosphere at a temperature between 40° C. and 100° C. to increase an aluminum oxide layer on a surface of the deformable aluminum body prior to applying an adhesive compound for producing an adhesive layer;
applying the adhesive compound having an inorganic-organic hybrid polymer in solution to the deformable body to produce the adhesive layer;
placing the strain gauge on the adhesive compound; and
hardening the applied adhesive layer at a temperature between 80° C. and 130° C. by exposing the deformable body with the strain gauge to the temperature for a duration between half an hour and three hours.

11. Method according to claim 10, comprising:
subjecting the strain gauge to a contact pressure between 100 kN/m² and 1000 kN/m² during the hardening.

12. Method according to claim 10, comprising,
subjecting the deformable body, formed of aluminum, to a chemical or electrochemical treatment to increase an aluminum oxide layer on a surface of the deformable body prior to applying the adhesive compound for producing the adhesive layer.

13. Method according to claim 10, comprising;
performing application of the adhesive compound for producing the adhesive layer using a tampon-printing method.

14. Method according to claim 10, wherein the adhesive compound consists of the inorganic-organic hybrid polymer in solution.

* * * * *